United States Patent Office 2,998,598
Patented Aug. 29, 1961

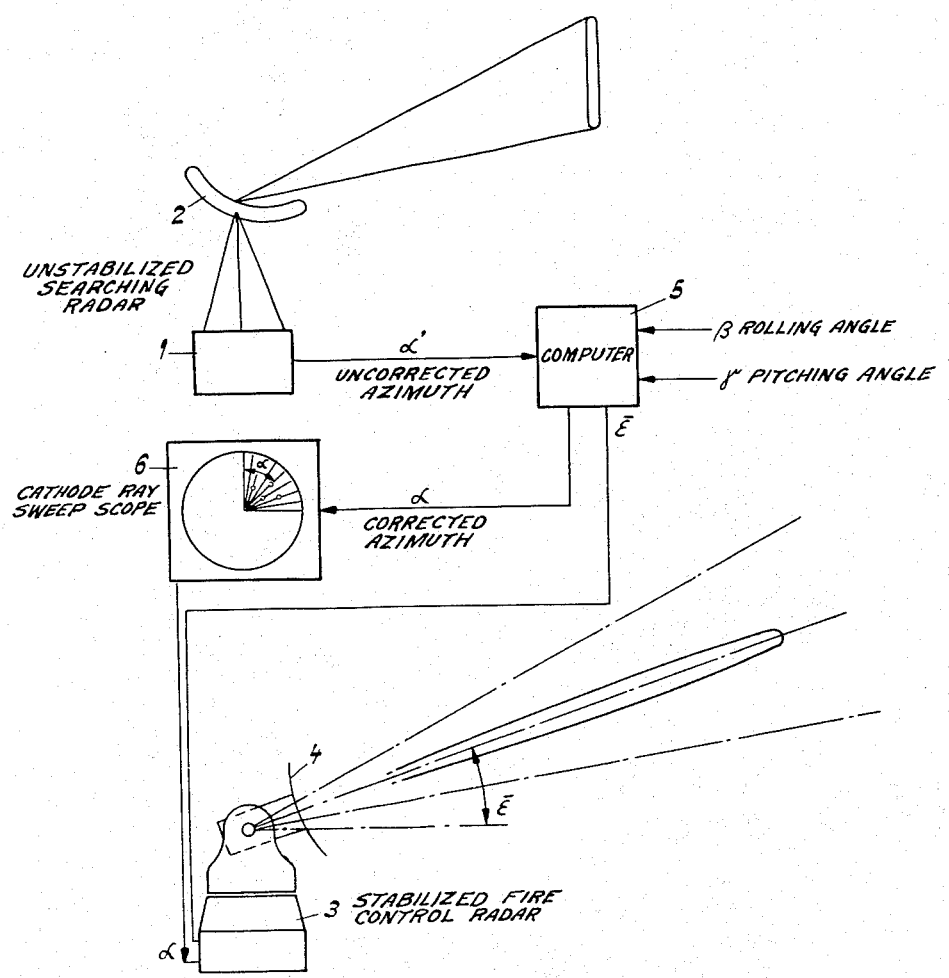

2,998,598
RADAR SYSTEMS FOR ANTI-AIRCRAFT CONTROL ABOARD SHIP
Arnold Braun, Urdorf, and Jean Patry, Zurich, Switzerland, assignors to Albiswerk Zürich A.G., Zurich, Switzerland, a Swiss corporation
Filed Aug. 21, 1956, Ser. No. 605,353
Claims priority, application Switzerland Sept. 2, 1955
4 Claims. (Cl. 343—7)

Our invention relates to radar systems primarily aboard ship, for the control of anti-aircraft guns.

Such systems, in most cases, are composed of a target searching or directing radar assembly and at least one gun-laying or fire-control radar assembly, these two assemblies being hereinafter referred to as "directing radar set" and "fire-control radar set" respectively.

The directing radar serves for reconaissance of aircraft from the largest possible distance and for issuing the azimuth value of detected aircraft to the fire-control radar. The directing radar is provided with a circularly searching antenna which turns about two to ten revolutions per minute about a vertical axis and scans the entire space below a given elevational angle, for instance of 45°. This antenna, for free circular vision, must be mounted as high as possible above the ship superstructures and, in most cases, is rather large and heavy. It would be desirable, in principle, to stabilize the axis of rotation of the circularly searching antenna to maintain this axis vertical in space, independently of the rolling and pitching movements of the vessel. Often, however, such a stabilization is prohibitive for reasons of expenditure and weight. The circular scanning antenna, therefore, follows the rolling and pitching movement of the vessel, and the determination of the azimuth values occurs with relation to a reference system of coordinates that move in space together with the vessel.

In contrast thereto, the fire-control radar set must always possess the same reference system for coordinates as the anti-aircraft guns which are stabilized relative to the above-mentioned motions of the vessel. Hence the coordinate reference system for the anti-aircraft guns and the fire-control radar set is given by the sea level at rest and by the horizontal axis of the ship. The latter axis defines the plane of reference for the azimuth used for gun laying.

Due to the relative motion between the two coordinate systems of reference, the azimuth values determined by the searching antenna and indicated by the directing radar set are affected by an error which, with large rolling and pitching angles and for high-flying targets, may amount up to ±30°. Under such conditions, the transmitted target data are illusory because the error is much greater than one-half of the angular beam width of the high-frequency beam issuing from the fire-control radar antenna which, under such circumstances, can no longer encompass the target.

It is an object of our invention to greatly minimize or virtually eliminate such deficiencies.

To this end, we provide a radar system which, like those mentioned above, is composed of a directing radar set and at least one fire-control radar set, the directing radar antenna performing a searching movement about an axis vertically related to the hull of the vessel, whereas the fire-control radar antenna is stabilized relative to rolling and pitching movements of the vessel. However, in accordance with a feature of our invention, we combine such a composite radar system with a computing apparatus which receives the azimuth value from the unstabilized directing radar set and, by evaluating the instantaneous rolling and pitching angles of the vessel together with an elevation value received from the fire-control radar set, converts that azimuth value automatically to a corrected azmuth in the coordinate reference system of the stabilized fire-control radar.

The theoretical investigation of the problem results in the following equation:

$$\tan \alpha' = \frac{\cos \alpha \sin \beta \sin \gamma + \sin \alpha \cos \beta - \sin \beta \cos \gamma \operatorname{tg} \epsilon}{\cos \alpha \cos \gamma + \sin \gamma \operatorname{tg} \epsilon}$$

In this equation:

$\alpha$ is the azimuth value of the target relative to the coordinate system of the fire-control radar,
$\alpha'$ is the azimuth value of the target relative to the coordinate system of the directing radar,
$\beta$ is the rolling angle,
$\gamma$ is the pitching angle,
$\epsilon$ is the elevation angle of the target.

By means of an automatic computer the azimuth $\alpha$ relative to the stabilized system of coordinates can be determined in accordance with the above-presented equation, provided the computer is supplied with the instantaneous values of rolling angle $\beta$ and pitching angle $\gamma$, as well as with the value of the angle of elevation $\epsilon$ relative to the stabilized coordinate system and at the moment when the target is traversed by the directing-radar beam. The rolling and pitching angles can simply be taken from the stabilizing equipment of the fire-control radar. The elevation angle of the target is not primarily available since the directing radar, in general, does not measure elevation. However, as will be explained below, a definite value indicative of elevation can be derived from the fire-control radar and permits determining, at least in approximation, the azimuth $\alpha$ of the fire-control radar from the azimuth value $\alpha'$ of the coordinate system moving together with the vessel, notwithstanding the fact that the angle of elevation of the target is unknown.

The invention will be more fully understood from the following description of an exemplary embodiment schematically illustrated in the drawing, showing only those system components that are required for describing and understanding the invention.

The radar system comprises a directing radar set 1 having a circular scanning antenna 2 rotating about a vertical axis, that is, perpendicular to a ship deck platform, and dependent upon the rolling and pitching movements of the ship. It also comprises a fire-control radar set 3 having an antenna 4 which is rotatable as well as vertically tiltable. The directing radar set 1 supplies an azimuth indication dependent upon the rolling angle $\beta$ and the pitching angle $\gamma$ of the vessel. This azimuth indication is translated by a computer 5 into a corrected azimuth relating to the coordinate reference system of the stabilized fire-control radar set 3. Denoted by 6 is the indicator of the directing radar set 1 consisting, for instance, of a plan position indicator (P.P.I.-scope) in which the cathode-ray sweep is a radius of the tube face from the face center outwardly and moves around through 360°. The P.P.I.-scope indicates azimuth as the direction of the radial line of sweep, the range value being indicated by the distance of the signal from the center of the screen.

As shown in the drawing the antenna 4 of the fire-control radar set 3 performs vertical searching movements about a median angle of elevation $\bar{\epsilon}$ in the computed azimuth direction $\alpha$ indicated on the screen of the indicator 6. This median angle of elevation $\bar{\epsilon}$, together with the instantaneous values of the rolling angle $\beta$ and pitching angle $\gamma$, are evaluated in the computer 5 which calculates the azimuth $\alpha$ relating to the stabilzed coordinate system and supplies the calculated azimuth value to the fire-control radar set 3 and to the indicator 6 of the directing radar set 1, so that the indication of the targets on the screen of the indicator 6 is effected with the correct azimuth value $\alpha$ as required for gun laying.

Since the computation of the azimuth $\alpha$ is carried out for the median elevational angle $\bar{\epsilon}$ of the scanning sector of the fire-control radar beam 1 the azimuth data are somewhat inaccurate for aircraft flying above or below this angle. However, such inaccuracies, with a vertical scanning sector of, for instance, 30° angular width and a median elevation angle of, for instance, 15° are not so large under permissible rolling and pitching conditions as to prevent the fire-control radar set from still encompassing the target.

When operating with larger median angles of elevation, for instance $\bar{\epsilon}=45°$, the azimuth errors in the scanning-beam sector become considerably larger; however such cases are of little importance because the directing radar has the purpose to recognize aircraft as early as possible, that is from a largest possible distance, and to supply corresponding data to the fire-control radar at a time when the targets appear below a relatively small angle of elevation.

The computer 5 calculates from the four input values the corrected azimuth value $\alpha$ relating to the stabilized coordinate system. By variation of the elevational angle $\epsilon$, the fire-control set radar 3 during its searching operation is continuously adjusted to the apertaining azimuth value $\alpha$, so that the high-frequency beam of the fire-control radar set constrainedly retains the target within beam range.

For computing the corrected azimuth value, any known and available computing device, operating mechanically or electronically, may be used, for example, that described in U.S. Patent No. 2,715,274, issued August 16, 1955.

We claim:

1. A radar system for use in directing anti-aircraft guns aboard ship, comprising a directing radar antenna and at least one fire-control radar antenna of which only the latter is stabilized relative to rolling and pitching of the ship, said directing radar antenna being mounted for circular motion about an axis substantially perpendicular with respect to the ship for determination of target azimuth, the fire-control antenna being mounted for lateral movement and for vertical searching movement about a median angle of elevation, a computing device connected with said directing antenna to receive an azimuth value therefrom and connected with said fire-control radar antenna to receive a median elevation value therefrom, means connected with said computing device for supplying said device with data of the instantaneous rolling and pitching angles respectively, so that said computing device, by evaluating said median elevation and said data, converts said azimuth value into a corrected azimuth relating to the coordinate reference system of said stabilized fire-control radar antenna, and means connected with said computing device for response to said corrected azimuth.

2. A radar system for use in directing anti-aircraft guns aboard ship, comprising a directing radar antenna and at least one fire-control radar antenna of which only the latter is stabilized relative to rolling and pitching of the ship, said directing radar antenna being mounted for circular motion about an axis substantially perpendicular with respect to the ship for determination of target azimuth, the fire-control antenna being mounted for lateral movement and for vertical searching movement about a median angle of elevation, a computing device connected with said directing antenna to receive an azimuth value therefrom and connected with said fire-control radar antenna to receive a median elevation value therefrom, means connected with said computing device for supplying said device with data of the instantaneous rolling and pitching angles respectively, so that said computing device, by evaluating said median elevation and said data, converts said azimuth value into a corrected azimuth relating to the coordinate reference system of said stabilized fire-control radar antenna, and means connected with said computing device for response to said corrected azimuth, said computing device being operative according to the following equation:

$$\tan \alpha' = \frac{\cos \alpha \sin \beta \sin \gamma + \sin \alpha \cos \beta - \sin \beta \cos \gamma \tan \epsilon}{\cos \alpha \cos \gamma + \sin \gamma \tan \epsilon}$$

in which $\alpha$ is the azimuth of the target relative to the coordinate system of the fire-control radar,
$\alpha'$ is the azimuth of the target relative to the coordinate system of the directing radar,
$\beta$ is the rolling angle,
$\gamma$ is the pitching angle,
$\epsilon$ is the elevation angle of the target.

3. A radar system for use in directing an anti-aircraft gun aboard a vessel, said system comprising a target-azimuth determining antenna providing a rotating radar beam, the axis of rotation of the beam shifting in dependence upon the rolling and pitching movements of the vessel, said antenna determining target azimuths with relation to a system of coordinates that moves in space together with the vessel, the azimuths determined by the said antenna being affected by an error caused by the rolling and pitching of the vessel, a fire-control radar antenna apparatus stabilized relative to the rolling and pitching of the vessel so as to have a stabilized coordinate system of reference, the fire-control antenna being mounted for rotation about a substantially vertical axis, and also for tilting about a substantially horizontal axis, to determine target elevation, means for receiving an azimuth determination from the unstabilized first antenna and for automatically converting said azimuth to a corrected azimuth with respect to the coordinate reference system of the stabilized fire-control radar antenna system, said automatic conversion being determined in accordance with the instantaneous rolling and pitching angles of the vessel and the elevation value received from the stabilized fire-control radar antenna apparatus.

4. A radar system for use in directing an anti-aircraft gun aboard a vessel, said system comprising a target-azimuth-determining antenna providing a rotating radar beam, the axis of rotation of the beam shifting in dependence upon the rolling and pitching movements of the vessel, said antenna determining target azimuths with relation to a system of coordinates that moves in space together with the vessel, the azimuths determined by the said antenna being affected by an error caused by the rolling and pitching of the vessel, a fire-control radar antenna apparatus stabilized relative to the rolling and pitching of the vessel so as to have a stabilized coordinate system of reference, the fire-control antenna being mounted for rotation about a substantially vertical axis, and also for tilting about a substantially horizontal axis, to determine target elevation, means for receiving an azimuth determination from the unstabilized first antenna and for automatically converting said azimuth to a corrected azimuth with respect to the coordinate reference system of the stabilized fire-control radar antenna system, said automatic conversion being determined in accordance with the instantaneous rolling and pitching angles of the vessel and the elevation value received from the stabilized fire-control radar antenna apparatus, said means for automatically converting to a corrected azimuth operating according to the following equation:

$$\tan \alpha' = \frac{\cos \alpha \sin \beta \sin \gamma + \sin \alpha \cos \beta - \sin \beta \cos \gamma \tan \epsilon}{\cos \alpha \cos \gamma + \sin \gamma \tan \epsilon}$$

in which

α is the azimuth of the target relative to the coordinate system of the fire-control radar,
α' is the azimuth of the target relative to the coordinate system of the directing radar,
β is the rolling angle,
γ is the pitching angle,
ε is the elevation angle of the target.

References Cited in the file of this patent

UNITED STATES PATENTS

| | | |
|---|---|---|
| 2,486,781 | Gittens | Nov. 1, 1949 |
| 2,511,614 | Agins et al. | June 13, 1950 |
| 2,634,412 | Meagher | Apr. 7, 1953 |
| 2,644,940 | De France | July 7, 1953 |
| 2,715,274 | James | Aug. 16, 1955 |